United States Patent

Boccard et al.

[11] Patent Number: 6,136,236
[45] Date of Patent: Oct. 24, 2000

[54] METHOD FOR MANUFACTURING COMPOSITE MATERIAL PIECES BY RESIN TRANSFER MOULDING

[75] Inventors: Alexis Boccard, St. Germain en Laye; Nicolas Chevassus, Chaville, both of France

[73] Assignee: Aerospatiale Societe Nationale Industrielle, Paris, France

[21] Appl. No.: 09/180,773
[22] PCT Filed: Jun. 18, 1997
[86] PCT No.: PCT/FR97/01096
  § 371 Date: Nov. 13, 1998
  § 102(e) Date: Nov. 13, 1998
[87] PCT Pub. No.: WO97/48546
  PCT Pub. Date: Dec. 24, 1997

[30] Foreign Application Priority Data

Jun. 19, 1996 [FR] France .................................. 96 07624

[51] Int. Cl.[7] .................................................. B29C 45/76
[52] U.S. Cl. ...................... 264/40.1; 264/40.5; 264/257; 425/145; 425/149; 700/50
[58] Field of Search ................................. 264/40.1, 40.3, 264/40.7, 40.5, 258, 294, 257; 425/145, 146, 149; 700/50

[56] References Cited

U.S. PATENT DOCUMENTS

| | | | |
|---|---|---|---|
| 3,137,750 | 6/1964 | Gringras ............................... | 264/257 |
| 4,120,922 | 10/1978 | Lemelson .............................. | 264/40.7 |
| 4,735,828 | 4/1988 | Cogswell et al. ..................... | 427/359 |
| 5,176,858 | 1/1993 | Tsukabe et al. ...................... | 264/40.1 |
| 5,223,191 | 6/1993 | Tatsuno et al. ...................... | 264/40.1 |
| 5,395,565 | 3/1995 | Nagaoka et al. ..................... | 264/40.5 |
| 5,516,271 | 5/1996 | Swenor et al. ....................... | 425/127 |
| 5,518,385 | 5/1996 | Graff .................................... | 425/127 |
| 5,518,388 | 5/1996 | Swenor et al. ....................... | 425/144 |
| 5,581,468 | 12/1996 | White et al. ...................... | 364/475.09 |
| 5,595,692 | 1/1997 | Folsom et al. ......................... | 264/36 |
| 5,595,693 | 1/1997 | Fujita et al. ......................... | 264/40.1 |

Primary Examiner—Jan H. Silbaugh
Assistant Examiner—Stefan Staicovici
Attorney, Agent, or Firm—Burns Doane Swecker & Mathis L.L.P.

[57] ABSTRACT

A manufacturing process of a large part of composite materials with a high fiber content (more than 58%) using the resin transfer moulding technique, wherein a fiber pellet (26) is placed in a mould (20) and strongly compressed, whilst the resin is injected at a constant reference flow rate value and while the instantaneous pressure at the mould inlet is lower than a reference pressure value. When this reference pressure value is reached, the injection flow rate is reduced to maintain the pressure at this level, and the compression of the pellet (26) is temporarily reduced. The injection flow rate is then altered to the constant reference flow rate value and the compression is increased, to start another cycle.

8 Claims, 4 Drawing Sheets

METHOD FOR MANUFACTURING COMPOSITE MATERIAL PIECES BY RESIN TRANSFER MOULDING

DESCRIPTION

1. Technical field

The invention concerns a manufacturing process for composite material parts, using the resin transfer moulding technique, otherwise known as RTM.

More precisely, the process of the invention is designed to manufacture large composite material parts on an industrial scale, with a high fibre content, which is to say over 58%.

This objective makes the process of the invention particularly attractive for the aviation industry. Consequently, parts manufactured using this process may be used in the construction of aeroplanes, helicopters, launchers, missiles, etc.

2. State of the Technique

The aviation industry has used composite materials for a number of years now. These materials allow, in particular, significant reductions in weight to be made whilst providing rigidity and mechanical properties that are comparable to those of metal parts.

Given this background, various techniques are used, depending on the nature and dimensions of the part to be manufactured. Amongst these techniques, we can especially mention filament winding, injection and stamping of thermoplastic materials and above all the autoclave moulding of textiles pre-impregnated with thermosetting resin.

In the particular case of the production of large parts such as the aerofoil or fuselage, the mechanical stresses specific to the aviation field make a high fibre content necessary, which is to say over 58%. In the current status of the technique, such material composite parts are made from textile that is pre-impregnated with thermosetting resin. The manufacturing process consists of draping the textiles onto a shape then compressing the textiles by covering them with a sealed vessel in which a vacuum is created. The assembly is then placed in an autoclave where it undergoes a heat treatment cycle to polymerise the resin.

In other fields such as the automobile industry, capital goods industry, etc., the resin transfer moulding, or RTM, technique, has been used for a lot of years to manufacture parts with a relatively low fibre content, which is to say less than 54%. This moulding technique consists of inserting a dry, fibre pellet into a mould, then injecting a liquid organic resin into the mould in a vacuum and at low pressure, so that the pellet is impregnated. Heating the resin-impregnated pellet polymerises the resin before it is removed from the mould.

At present, this RTM technique is relatively well controlled for the production of parts with a low fibre content, which is to say with a fibre content of less than 54%.

In comparison with other techniques which use composite materials, the RTM technique has many advantages, such as the reduction in the overall implementation time involved, the low level of investment for the production system (no chilling system or autoclave), the high dimensional accuracy of the parts produced, especially in terms of thickness, the very good surface finish, the exceptionally good health and safety conditions, etc.

However, when parts with a high fibre content are to be produced, which is to say with a fibre content of more than 58%, as demanded by the aviation and space industries for example, the resin must be injected into the mould containing the dry fibre pellet when the pellet is strongly compressed. Within its known implementation procedures, the RTM technique does not allow large parts to be produced with this degree of compression.

In fact, the high loss of load introduced by the highly compressed textile fibres of the pellet slows the resin's penetration into it.

Furthermore, the pressure at which the resin is injected must remain sufficiently low so that the direction of the textile fibres is not altered during injection. It is known that the mechanical properties of the part produced are essentially defined by the direction of the textile fibres in the resin matrix.

Consequently, when the volume of the part to be produced increases, the time required for the resin to penetrate the entire mould exceeds the time required for the resin to start polymerising (usually called "gel time"). Moreover, the obstacle to the penetration of the resin created by the strongly compressed textile fibres risks creating zones which are not impregnated with the resin in the part, as well as micro-bubbles.

For these various reasons, the RTM technique cannot at present be used to manufacture large parts with a high fibre content.

More or less complex processes have been developed over the last few years, especially in the injection moulding techniques, in order to optimise the control of the various injection parameters, such as the flow rate, pressure, temperature, etc., taking into account the geometry of the part being manufactured. By way of example, the U.S. Pat. No. 5 178 805, U.S. Pat. No. 6 316 707 and U.S. Pat. No. 4 850 217 documents illustrate different processes developed in this area.

However, at the present time, there are no equivalent processes in the resin transfer moulding field which allow large parts with a high fibre content to be manufactured, by resolving the problems listed above.

3. Disclosure of the Invention

The exact subject of the invention is a composite material manufacturing process by resin transfer moulding, which makes possible the manufacture of large parts with a fibre content of over 58%, guaranteeing low porosity (1 to 3%) in the part, without the risk of premature gelling of the resin or the presence of zones that the resin has not impregnated inside the part.

According to the invention, this result is obtained by means of a composite material manufacturing process by resin transfer moulding in a mould containing a fibre pellet, characterised in that it includes the following steps:

a) high compression of the fibre pellet in the mould, in order to obtain a fibre content of more than 58%, and simultaneous injection of a resin into the mould at a constant flow reference value, provided that the instantaneous pressure at the mould inlet is lower than the pressure reference value;

b) a reduced resin injection flow rate into the mould, in order to maintain the instantaneous pressure at a value that is virtually equal to the pressure reference value when this reference value is reached;

c) a temporary reduction of the compression of the fibre pellet in the mould;

d) a progressive increase in the resin injection flow rate into the mould, until the reference value is reached; and e) return to step a).

In the process thus defined, steps b) to d) are transitory steps, of relatively short duration, whose effect is to bring the resin injection conditions to a nominal state in which the injection is performed at a constant flow, in accordance with step a). The change to one of the steps b) to d) may be due to various reasons such as the presence of a cold spot in the mould, a variation in the viscosity of the resin, a leak in the hydraulic system or even the decompression of the fibre pellet. This change can therefore occur several times during the manufacture of a single part.

If the operator reduces the pressure reference value, for a particular reason, while the resin is being injected into the mould, this automatically causes a change to step b) when the instantaneous pressure at the mould inlet is at least equal to the new pressure reference value.

In a preferred embodiment of the process of the invention, a flow rate regulation signal is created constantly, from at least an initial signal which is representative of a difference between the pressure reference value and the instantaneous pressure at the mould inlet. This flow rate regulation signal is then compared to the reference flow rate, in order to emit a control signal. When the flow rate regulation signal is at least equal to the reference flow rate, this control signal commands the resin injection at the constant reference flow rate, in accordance with step a). On the contrary, when the flow rate regulation signal is lower than the reference flow rate, the control signal commands the resin injection at a reduced flow rate which varies with the flow rate regulation signal, in accordance with step b).

The flow rate regulation signal will be preferably created from a second signal which is representative of the difference between the two first consecutive signals.

In particular, the control signal can be a speed signal, input into a speed variator connected to an electric motor which commands an actuator for the injection of the resin in the mould.

The flow rate regulation signal is then created from a third signal, which is representative of a difference between a maximum permissible pressure at the actuator output and an instantaneous pressure measured at the actuator output.

A signal which is representative of a maximum permissible torque for the electric motor can also be entered into the speed variator.

In the preferred embodiment of the invention, the flow rate regulation signal will be created in fuzzy logic.

BRIEF DESCRIPTION OF THE DRAWINGS

We will now describe, by way of a non-restrictive example, a preferred embodiment of the process of the invention, referring to the appended drawings, in which.

DETAILED PRESENTATION OF A PREFERRED EMBODIMENT

Figure 1:
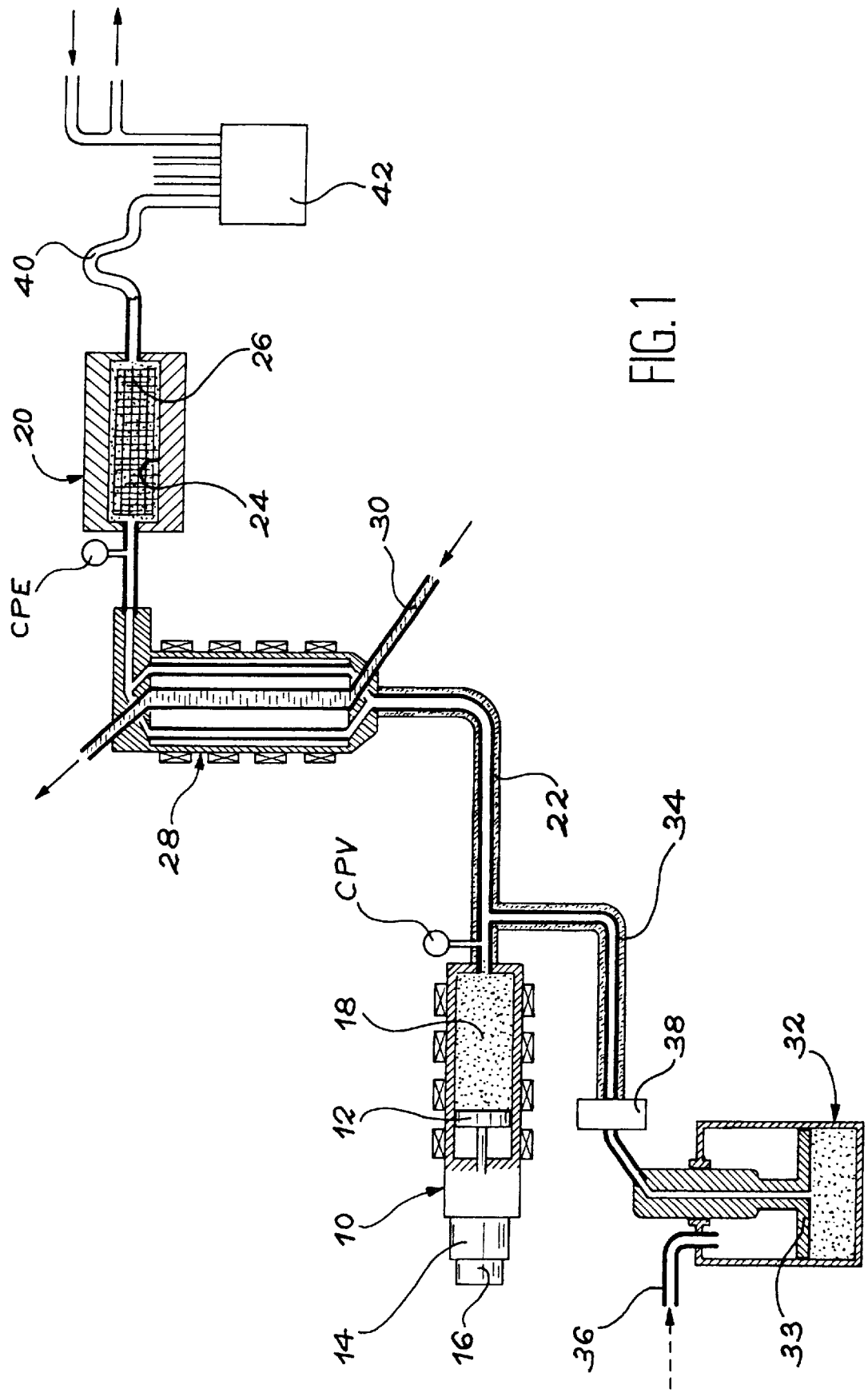
FIG. 1 is a cross-sectional view which shows very schematically a manufacturing installation for a composite material part using the RTM technique, adapted to the embodiment of the process of the invention.

First of all, we will describe the main mechanical components, by referring to FIG. 1, of a resin transfer moulding installation, suited to the process embodiment of the invention. This installation is composed of an injection actuator 10, whose piston 12 is actuated by an electric motor 14. This electric motor 14 is equipped with a speed variator (not shown) and an encoder 16.

The resin 18 in the actuator 10 is injected by the latter into a mould 20 via an injection tube 22.

Inside the mould 20 is a cavity 24 whose form is complementary to that of the part to be manufactured. Before the mould is closed and connected to the injection tube 22, a dry fibre pellet 26 is placed in the cavity 24. In addition, the mould 20 is linked to equipment (not shown) which allows a compression effort of variable force to be applied to the pellet 26. By way of example which is in no way restrictive, the equipment which applies the compression effort to the pellet can include in particular one or more inflatable bladders (not shown) placed with the pellet 26 in the mould cavity 24, as stated particularly in the FR-A-2 720 028 document.

A heat exchanger 28 is placed on the injection tube 22, between the actuator 10 and the mould 20. A water circulation system 30 or any other equivalent system permits the resin to be brought to the desired temperature at the inlet to the mould 20. To this end, the heat exchanger 28 can be equipped with temperature regulation equipment, in a known technology which is not part of the invention.

The mechanical part of the moulding installation shown in FIG. 1 also includes a resin feed pot 32, connected to the injection tube 22 by means of a tube 34, immediately at the outlet of the actuator 10. The pot 32 is equipped with a piston 33 which is used to drive the resin from the pot 32 towards the actuator 10 when compressed air is injected into the pot by means of a tube 36. The transfer of the resin from the pot 32 to the actuator 10 is controlled by a regulator 38 inside the tube 34. If necessary, the resin can pass through a de-bubbling pot (not shown) before being transferred to the pot 32.

After the mould 20 and opposite the injection tube 22, the cavity 24 of the mould 20 is connected by an exhaust tube 40 to a decantation pot 42.

There are valves (not shown) in the various tubes, 22, 34 and 40, in particular to isolate the various pieces of equipment from each other. Other equipment (not shown) also allows the installation to be drained when the resin injection is complete.

In accordance with the invention, an installation such as the one just described, referring to FIG. 1, is commanded automatically or semi-automatically, so that the resin is injected into the mould 20 at a constant reference flow rate Q, as far as possible, without the instantaneous pressure PE at the inlet to the mould 20 exceeding a reference pressure value PE max.

To this end, the command of the resin injection is carried out in a cycle, the main steps of which will now be described, referring to FIGS. 2A to 2D.

Figure 2A:
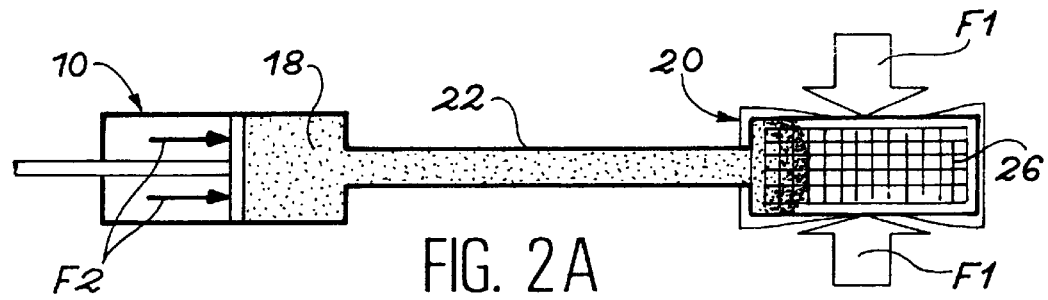
FIGS. 2A to 2D shows very schematically the main steps in the embodiment of the process of the invention.
Figure 2B:
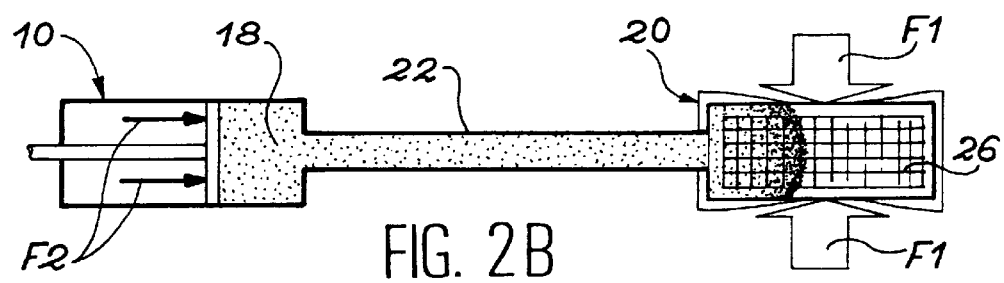

FIGS. 2A and 2B show very schematically the first step of the manufacturing process of the invention. This first step is the basic step of the process, which is to say the step that the system returns to automatically as soon as certain conditions have been satisfied. From this point of view, the system can be considered as "reversible".

As shown by the F1 arrows in diagrams 2A and 2B, this first step is distinguished by strong compression of the fibre pellet 26 contained in the mould 20. More precisely, this strong compression is determined so that the fibre content in the part produced is higher than 58%.

This first step of the process of the invention is furthermore distinguished by the fact that the resin 18 is injected into the mould 20 containing the strongly compressed fibre pellet 26, at a constant reference flow rate Q. This reference flow rate Q is symbolised by the F2 arrows on FIGS. 2A and 2B. The resin injection flow rate is regulated by the actuator 10, in a manner that will be described further on.

The execution of this first step of the manufacturing process of the invention is conditioned by the need for the instantaneous pressure PE at the inlet of the mould 20 to be lower than the reference pressure value PE max. The instantaneous pressure PE is measured by a CPE pressure sensor (FIG. 1) mounted on the tube 22 at the inlet of the mould 20.

FIG. 2B shows the continuation of the injection of the resin 18 in the mould 20, in conformity with the first step of the process of the invention, before the instantaneous pressure PE at the inlet of the mould reaches the PE max. reference pressure value. This reference pressure value PE max. is determined beforehand, according to the characteristics of the part to be produced, so that the pressure induced in the mould when the resin is injected does not risk damaging the fibres of the pellet 26 or changing their direction. It should also be noted that the value of this PE max. reference pressure value may, in certain cases, be modified during the injection. Such a modification may be justified in particular by a change in the characteristics from one region of the mould to another, due to the use of fibres of different natures for example.

Figure 2C:
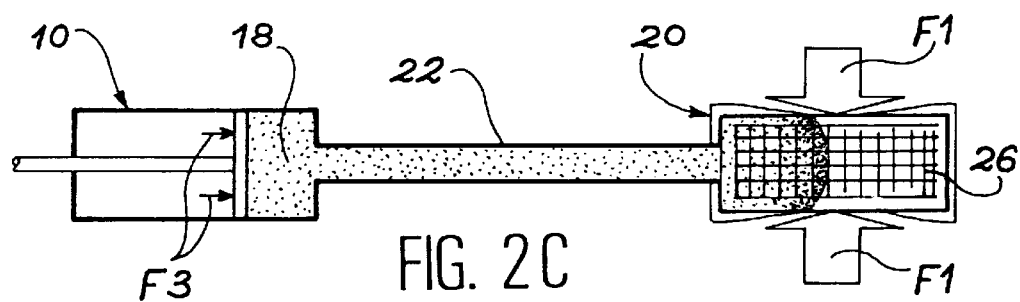

FIG. 2C shows a second phase of the manufacturing process of the invention. The change to this second phase takes place automatically when the instantaneous pressure PE measured at the inlet of the mould 20 reaches the PE max. reference pressure value. This situation occurs naturally in the absence of any change to the PE max. reference pressure value, due to the fact that the resistance to the advance of the resin 18 increase progressively as the resin advances in the mould 20, due to the presence of the strongly compressed pellet . The change to the second phase of the process, shown in FIG. 2C, also occurs when the PE max. reference pressure value is reduced during the injection of the resin into the mould to a value such that the PE instantaneous pressure value at the inlet of the mould 20 is at least equal to the new reference pressure value.

In any case, this second step of the manufacturing process is characterised by a reduction of the injection flow rate of the resin into the mould 20. This reduction, generated by the actuator 10 in a manner which will be explained further on in the document, is carried out so that the instantaneous pressure PE at the inlet to the mould 20 is maintained at a value which is virtually the same as the PE max. reference pressure value. In this second phase, this flow rate is reduced to a variable value Q symbolised by the F3 arrows in FIG. 2C.

When a large part is manufactured, the change to the second step of the manufacturing process of the invention can occur several times, well before the end of the injection of the resin into the mould. In fact, as it has already been pointed out, this change may be due to several reasons, the consequence of all of them being a variation, sometimes brutal, of the PE instantaneous pressure measured at the mould inlet. It is therefore preferable to ensure a return to injection at a regulated flow as quickly as possible, which is to say a return to the first step which has already been described, referring to FIGS. 2A and 2B. In fact, it is known that an injection of resin at a regulated flow is the essential condition required to obtain a homogeneous part that is practically free from porosity.

Figure 2D:
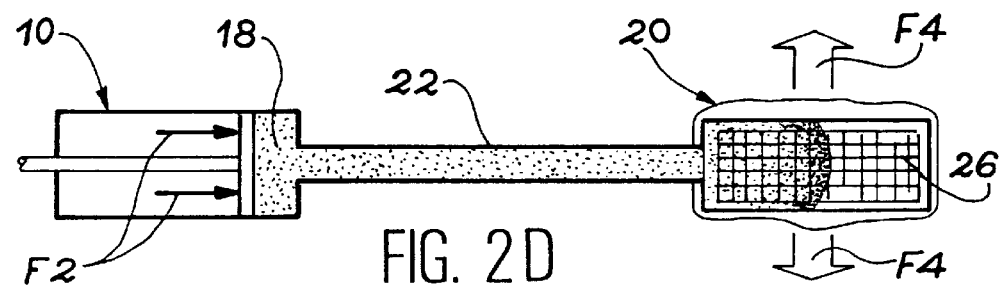

To make this return to the first step possible, the process of the invention includes a third step, shown in FIG. 2D, which is characterised by a reduction of the compression of the fibre pellet 26, shown by the F2 arrows in FIG. 2D. Due to the reduction in the compression of the pellet 26, the instantaneous pressure PE at the inlet of the mould 20 immediately drops below the PE max. reference pressure value. Consequently, the reduction of the compression of the pellet 26 can be followed virtually instantaneously by an increase in the injection flow rate of the resin 18 into the mould 20 to the reference flow value Q, as is also shown by the F2 arrows in FIG. 2D.

At this point, strong compression can once again be applied to the pellet 26, creating a return to the first step of the manufacturing process of the invention and consequently a new cycle of this process is started.

The manufacturing process of the invention is thus a reversible process, which allows an automatic return to a step where the resin is injected at a constant flow rate while the fibre pellet is strongly compressed, as soon as the instantaneous pressure PE at the inlet of the mould drops below the PE max. reference pressure value.

Thanks to these characteristics, it is possible to manufacture large parts with a fibre content of more than 58%, using a number of cycles which increases or decreases depending on whether the part is small or large. It should be noted that this possibility offered by the process of the invention is provided whilst maintaining the intrinsic qualities of the RTM techniques, guaranteeing a particularly low level of porosity and ensuring that the fibres of the pellet are not damaged or their direction changed by the injection.

Figure 3:
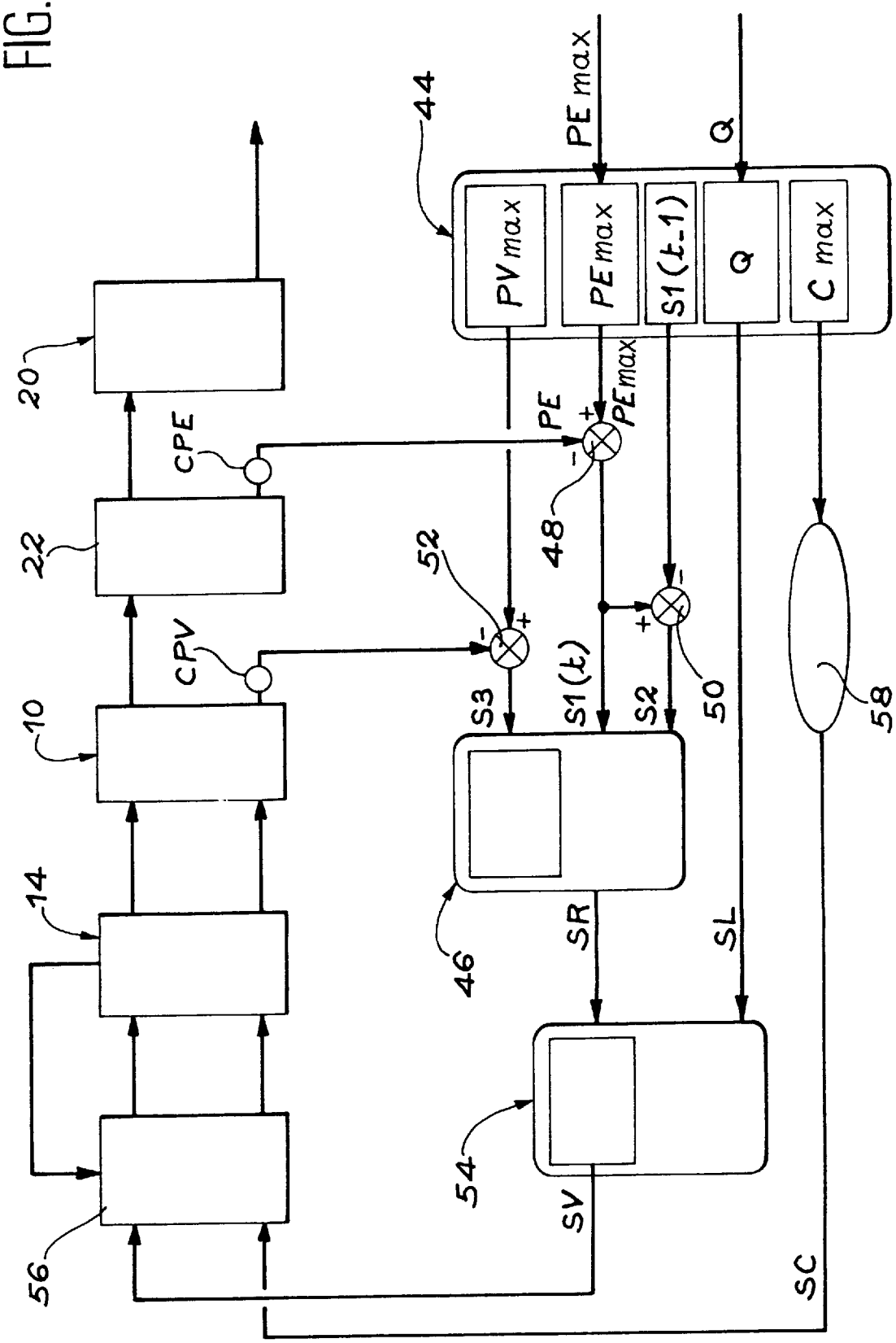
FIG. 3 is a block diagram which is a functional illustration of the various means that can be used to implement the process of the invention, in the installation of FIG. 1.

We will now describe in more detail the implementation of the manufacturing process of the invention, referring to FIG. 3, which shows schematically the different pieces of equipment used to command the actuator 10 and their mode of action.

In the embodiment shown, a PLC 44 in particular regulates the flow via a fuzzy logic regulation board 46. The various parameters of this regulation board 46 may be configured freely by means of the PLC 44.

As shown schematically in FIG. 3, the PLC 44 has input elements such as thumb wheels which allow a PE max. reference pressure value and a flow rate reference value Q to be entered into the system. The choice of the PE max. reference pressure value is essentially dependent on the characteristics of the part to be produced. The flow rate reference value Q is chosen to suit the volume of the mould to be filled and the gelling time at the injection temperature for the resin system selected.

Other reference values are also entered into the PLC 44, generally once only for a given injection installation. In the example shown, these reference values include a maximum permissible pressure value PV max. at the outlet of the actuator 10, taking the mechanical characteristics of the latter into account. They also include a maximum permissible torque value C max. for the electric motor 14.

As shown schematically in 48 in FIG. 3, the PLC 44 calculates in real time a first signal S1, which is representative of the difference or ΔPE between the PE max. reference pressure value and the instantaneous pressure PE measured by the CPE sensor at the inlet of the mould 20. This first signal S1 is one of the input values entered into the fuzzy logic regulation board 46.

As shown in 50 in FIG. 3, the PLC 44 also creates a second signal S2, which is representative of the ERPE difference between the two signals, which is to say the variation ratio of the S1 signal. More precisely, this second signal S2 is equal to the difference between the last S1 signal calculated by the comparator 48 at time t and the S1 signal immediately before it, at t-1. The second signal S2 is also an input value entered into the fuzzy logic regulation board 46.

In the embodiment shown in FIG. 3, a third input value is also entered into the fuzzy logic regulation board 46, made up of a third signal S3. This third signal is representative of the difference or ΔPV between the maximum permissible pressure PV max. at the outlet of the actuator 10 and the instantaneous pressure value PV measured by the CPV sensor at the outlet of the actuator 10. The third signal S3 is also created by the PLC 44, as shown schematically in 52 in FIG. 3.

From the three signals, S1, S2 and S3, the fuzzy logic regulation board 46 continuously creates a flow rate regulation signal SR. The essential characteristics of the rules which govern the creation of this SR flow rate regulation signal will be briefly presented further on. It should be noted that this SR regulation signal is in reality a speed signal, which determines at all times the speed at which the electric motor 14 has to rotate to satisfy the rules of the fuzzy logic regulation board 46.

The SR flow rate regulation signal is entered into a flow rate limiting PLC 54. This PLC 54 also receives a signal SL, whose constant level is representative of the flow rate reference value Q previously entered into the PLC 44.

The flow rate limiting PLC 54 supplies a command signal SV, which is also a speed signal. The SV command signal is entered into a speed variator 56 connected to the electric motor 14 which controls the injection actuator 10. This SV command signal is equal to the SL signal as long as the SR flow rate regulation signal is equal to or higher than this SL signal. In return, the SV command signal is equal to the SR flow rate regulation signal when this SR signal is lower than the SL signal which is representative of the flow rate reference value Q.

Consequently, the electric motor 14 is commanded continuously by the speed variator 56, so that the injection flow rate of the resin into the mould 20 is constant and equal to the flow rate reference value Q, as long as the SR flow rate regulation signal is higher than the SL signal, which is representative of this flow rate reference value. In return, the electric motor commanded by the speed variator 56 drives the injection actuator 10 so that the resin is injected into the mould 20 at a flow rate q which is lower than the reference flow rate value Q, when the value of the SR flow rate regulation signal is lower than that of the SL signal. The injection flow rate q then changes in accordance with the value of the SR signal.

As we will see further on, the SR flow rate regulation signal is determined by the fuzzy logic regulation board 46 principally from the instantaneous pressure PE at the inlet of the mould 20. The system shown schematically in FIG. 3 therefore allows the manufacturing process described previously, referring to FIGS. 2A to 2D, to be implemented.

As has also been shown in FIG. 3, the speed variator 56 which commands the electric motor 14 which drives the actuator 10 also receives a signal SC, which is representative of the maximum permissible torque C max. for the electric motor 14. This SC signal is derived directly from the value of the C max. maximum permissible torque entered into the PLC 44, after passing via a scaling circuit 58.

We will now describe in more detail the creation of the SR flow rate regulation signal in the fuzzy logic regulation board 46, from the three input signals, S1, S2 and S3, which respectively represent the three input values ΔPE, ERPE and ΔPV.

The recourse to fuzzy logic is justified by the necessity to manage two pressure regulations simultaneously (PE at the mould inlet and PV at the actuator outlet). Another advantage of the use of fuzzy logic is that it allows the injection to be controlled, without mathematical modelling needing to be identified for each element (speed variator 56, electric motor 14, geared reducer linked to this motor, actuator 10, pipework 22, exchanger 28, valves, resin, etc.).

The fuzzy logic processing carried out by the regulation board 46 can be broken down into three steps schematically:
 transformation of each of the instantaneous input signals S1, S2 and S3 into a fuzzy element (input step);
 transformation of the fuzzy elements derived from the input signals into a fuzzy element which is representative of the output signal (inference step);
 transformation of the fuzzy element resulting from the inference step into an SR instantaneous output signal (output step).

This processing allows modelling of the expertise of the operators who usually use the resin transfer moulding installations to be carried out. In reality, this modelling is obtained on the basis of logic rules which describe the possible conditions of the system in fuzzy terms along with the appropriate actions for these conditions. These logic rules are the inference step.

The transformations made during the input and output steps are carried out by attributing membership functions to each of the input and output values. These membership attributions are fuzzy groups, mathematically defined in general by triangular or trapezoidal functions.

Thus, in the fuzzy logic regulation board 46, the instantaneous value of each of the signals S1, S2 and S3 is compared to the pre-defined membership functions for each of the input values ΔPE, ERPE and ΔPV.

In the embodiment described, the membership functions attributed to the difference ΔPE between the PE max. reference pressure value and the instantaneous pressure PE at the inlet of the mould 20 are: large negative (Ng), medium negative (Nm), small negative (Np), zero, small positive (Pp), medium positive (Pm) and large positive (Pg).

Similarly, the membership functions attributed to the ERPE variation ratio, which is equal to the difference between the two first consecutive S1 signals are: large negative (Ng), medium negative (Nm), small negative (Np), zero, small positive (Pp), medium positive (Pm) and large positive (Pg).

Finally, the only membership function attributed to the difference in the ΔPV input value, which is representative of the difference between the PV max. maximum permissible pressure at the outlet of the actuator 10 and the instantaneous pressure PV measured at the outlet of this actuator is: bad.

In the fuzzy logic regulation board 46, membership functions are attributed to the output value, composed in this case by the ΔSR changes of the speed of rotation of the electric motor 14, represented by the SR flow rate regulation signal. In the embodiment described, the functions attributed to the output value are: large negative (Ng), medium negative (Nm), small negative (Np), zero, small positive (Pp), medium positive (Pm) and large positive (Pg).

The membership functions of the input values are related to the membership attributions of the output values by a table of rules. If the influence of the input value ΔPV is not taken into account (which in practice only occurs rarely), this table of rules has two inputs (ΔPE and ERPE) and one output (ΔSR). This table of rules has been drawn up on an experimental basis. For example, it could be in the form shown below:

TABLE OF RULES

| ΔSR | ERPE | | | | | | |
|---|---|---|---|---|---|---|---|
| | Ng | Nm | Np | Ze | Pp | Pm | Pg |
| ΔPE Ng | Ng | Ng | Ng | Ng | Ng | Ng | Ng |
| Nm | Ng | Ng | Ng | Ng | Nm | Nm | Nm |
| Np | Nm | Nm | Nm | Np | Ze | Ze | Ze |
| Ze | Ze | Ze | Ze | Ze | Ze | Ze | Ze |
| Pp | Ze | Ze | Ze | Pp | Pm | Pm | Pm |
| Pm | Pm | Pm | Pm | Pg | Pg | Pg | Pg |
| Pg | Pg | Pg | Pg | Pg | Pg | Pg | Pg |

Furthermore, the only rule which relates the ΔPV input value to the ΔSR output value is:

if ΔPV=BAD, then ΔSR=Ng.

This is a priority rule, which is to say that it takes precedence regardless of the other input values.

The membership functions attributed to the ΔPE difference, the ERPE difference ratio, the ΔPV difference and the ΔSR changes to be made to the speed of rotation of the electric motor 14 are respectively shown in FIGS. 4A, 4B, 4C and 4D.

In the case of the ΔPE and ERPE input values (FIGS. 4A and 4B), the membership functions have, for example, the form of identical isosceles triangles, which partially overlap and the bases of which are situated on the X axis and are regularly offset with regard to one another. The instantaneous value of the corresponding value is marked or read on the X axis, depending on whether it is the input or output value. The Y axis determines the degree of membership of the value with each of the functions, the height of the isosceles triangles which are representative of these functions being equal to one unit. The dimensions and width of the bases of the triangles are determined from experience.

In the case of the ΔPV input value (FIG. 4C), the "BAD" membership function is in the form of a trapezoidal rectangle whose height is equal to one unit.

Figure 4A:
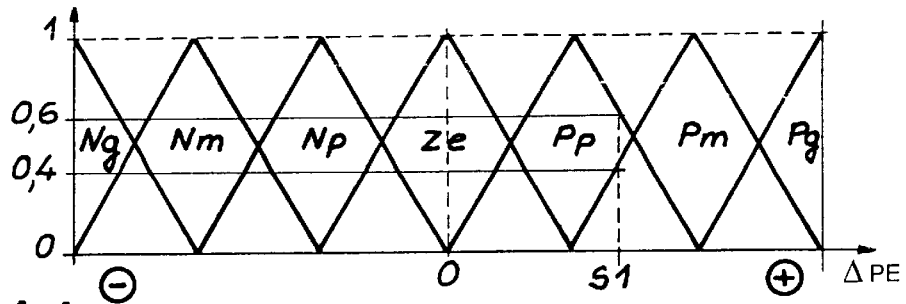
FIGS. 4A, 4B, 4C and 4D show the membership functions of the three input values and the output value of the fuzzy logic regulation board used in the embodiment shown in FIG. 3.
Figure 4B:
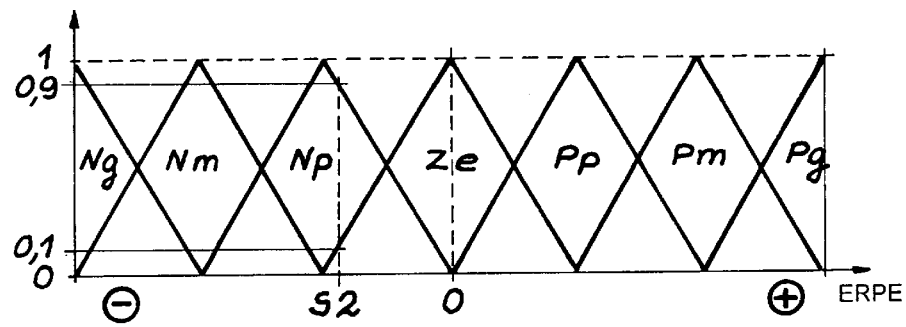
Figure 4C:
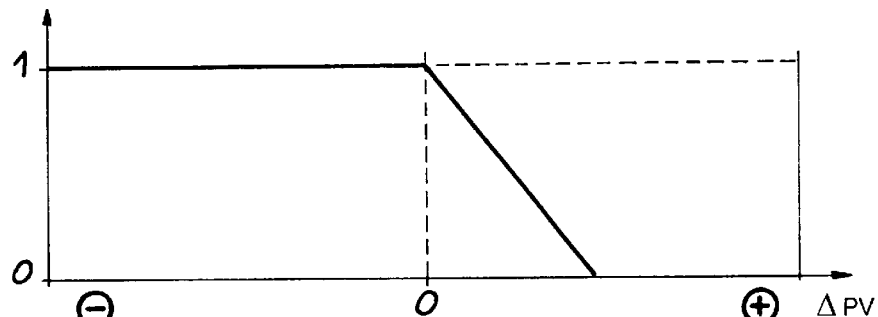
Figure 4D:
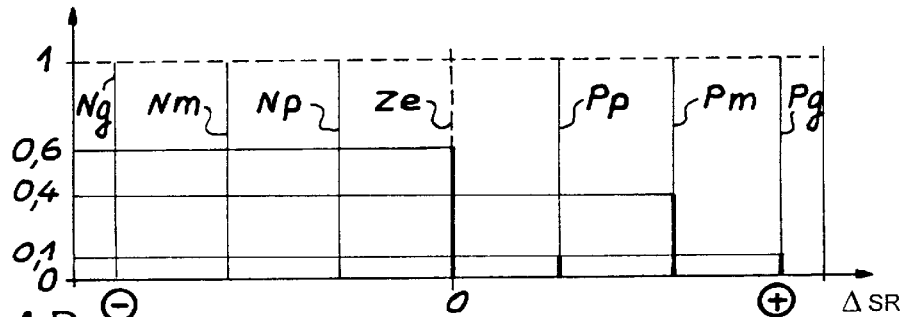

Finally, as shown in FIG. 4D, the membership functions which correspond to the ΔSR output value are regularly spaced straight segments that are parallel to the Y axis. The length of each segment is equal to one unit. Each segment therefore corresponds to a clearly defined increase (+direction) or decrease (−direction) of speed.

All of the parameters corresponding to the table of rules and membership functions are entered once only into the fuzzy logic regulation board 46.

Supposing that the instantaneous pressure PV at the actuator outlet is slightly lower than the maximum permissible pressure PV max., as is usually the case, the fuzzy logic regulation board 46 determines the change ΔSR to be made to the SR flow rate regulation signal from the instantaneous input values, ΔPE and ERPE, given by the S1 and S2 signals.

In this way, upon input, the fuzzy logic regulation board 46 determines the degree of conformity of each of the input values ΔPE and ERPE with the membership functions concerning these values.

More precisely and by way of example, let us suppose that the value of the first signal S1, marked on the X axis of the membership functions of the ΔPE difference, are both in the isosceles triangles which are representative of the Pm and Pp membership functions associated to this value (FIG. 4A). This means that the difference between the PE max. reference pressure value and the instantaneous pressure PE measured at the mould inlet is positive and that its amplitude is between small and medium. The degree of membership 0.4 and 0.6 of this ΔPE difference, respectively of each of the Pm and Pp membership functions, is given by the Y axis value of the intersection of sides of the triangle which represents it, with the height being taken from the representative point of the first signal.

Let us also suppose, still by way of example, that the value of the second value S2, marked on the X axis of the membership functions of the ERPE variation ratios of the first signal, is both in the isosceles triangles which are representative of the Ze and Np membership functions associated to this value (FIG. 4B). This means that the pressure at the mould inlet is very slightly reduced. The degree of membership 0.1 and 0.9 of this ERPE variation ratio, respectively of each of the Ze and Np membership functions, is obtained in the same way as the ΔPE difference.

In the previous hypotheses, four of the rules of the table shown earlier in the document by way of example are concerned:

if ΔPE=Pm and ERPE=Ze, then ΔSR=Pg (1$^{st}$ rule);
if ΔPE=Pm and ERPE=Np, then ΔSR=Pm (2$^{nd}$ rule);
if ΔPE=Pp and ERPE=Ze, then ΔSR=Pp (3$^{rd}$ rule);
if ΔPE=Pp and ERPE=Np, then ΔSR=Ze (4$^{th}$ rule).

For each of these four rules, the fuzzy logic regulation board 46 compares the degrees of conformity of each of the ΔPE and ERPE input values with the membership functions concerned by the rule in question, and the smallest degree of conformity is the one used.

Therefore, in the case of the first rule above, the membership functions concerned the Pm function for the ΔPE difference and the Ze function for the ERPE variation ratio. In the case of the S1 and S2 signals, whose values have been shown by way of example in FIGS. 4a and 4B, the degrees of conformity corresponding to these membership functions Pm and Ze are respectively 0.4 and 0.1. It is therefore the latter value, 0.1, which is used. The same procedure thus gives values for the degrees of conformity used for the second, third and fourth rules of 0.4, 0.1 and 0.6 respectively.

The degree of conformity thus used for each of the rules considered is applied to the membership function of this rule, for the ΔSR output value.

Consequently, and as illustrated in FIG. 4D, this leads to the ΔSR output value membership functions, Pg, Pm, Pp and Ze, being attributed degrees of conformity of 0.1, 0.4, 0.1 and 0.6 for the S1 and S2 signals shown by way of example in FIGS. 4A and 4B.

For the output, the fuzzy logic regulation board 46 determines the position of the centre of gravity of all of the Pg, Pm, Pp and Ze membership functions thus weighted by the degrees of conformity of 0.1, 0.4, 0.1 and 0.6. It then alters the previous value of the SR slow rate regulation signal by determining the ΔSR change to be made to this value from the X axis of this centre of gravity. In the example shown, the SR signal increases by a value which is slightly higher than that which corresponds to the Pp membership function.

Of course, the invention is not limited to the embodiment which has just been described with reference to the figures. Consequently, in the case of the installation including an injection actuator capable of withstanding all of the pressures which are likely to be reached in the manufacturing ranges concerned, it is not necessary to take the instantaneous pressure at the actuator outlet into account.

What is claimed is:

1. A process for manufacturing composite material parts by resin transfer moulding in a mould containing a fibre pellet, said process comprising the following steps:

a) compressing of the fibre pellet in the mould to obtain a fibre content of more than 58%, and simultaneously injecting resin into the mould through a mould inlet at a constant reference flow rate, while an instantaneous pressure at the mould inlet is lower than a reference pressure value, b) when this reference pressure value is reached, reducing the injection flow rate of the resin into the mould, so that the instantaneous pressure is maintained at a value that is virtually the same as the reference pressure value, c) temporarily reducing compression of the fibre pellet in the mould;

d) progressively increasing the injection flow rate of the resin into the mould until the reference flow rate is reached; and e) returning to step a).

2. The process of claim 1, comprising reducing the reference pressure value when the resin is being injected into the mould, thereby causing an immediate change to step b) when the instantaneous pressure is at least equal to the new reference pressure value.

3. The process of claim 1, comprising constantly creating a flow rate regulation signal from at least a first signal which is representative of a difference between the reference pressure value and the instantaneous pressure at the mould inlet, comparing this flow rate regulation signal to the reference flow rate value and emitting a control signal capable of commanding the resin injection at the constant reference flow rate value, in accordance with step a), when the flow rate regulation signal is at least equal to the reference flow rate value, and further capable of commanding the resin injection at a reduced flow rate which varies with the flow rate regulation signal, in accordance with step b), when the flow rate regulation signal is lower than the reference flow rate value.

4. The process of claim 3, wherein the flow rate regulation signal is also created from a second signal which is representative of a difference between two consecutive first signals.

5. The process of claim 3, wherein the control signal is a speed signal entered into a speed variator connected to an electric motor, which drives an actuator that injects the resin into the mould.

6. The process of claim 5, wherein the flow rate regulation signal is also created from a third signal which is representative of a difference between a maximum permissible pressure and an instantaneous pressure at an outlet of the actuator.

7. The process of claim 5, comprising entering into the speed variator a signal, which is representative of a maximum permissible torque value for the electric motor.

8. The process of claim 3, wherein the flow rate regulation signal is created using fuzzy logic.

* * * * *